(12) United States Patent
Matejka et al.

(10) Patent No.: US 9,465,503 B2
(45) Date of Patent: *Oct. 11, 2016

(54) IN-PRODUCT QUESTIONS, ANSWERS, AND TIPS

(71) Applicant: AUTODESK, INC., San Rafael (CA)

(72) Inventors: Justin Frank Matejka, Etobicoke (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/650,064

(22) Filed: Oct. 11, 2012

(65) Prior Publication Data

US 2013/0103714 A1    Apr. 25, 2013

Related U.S. Application Data

(60) Provisional application No. 61/547,658, filed on Oct. 14, 2011.

(51) Int. Cl.
*G06F 17/30* (2006.01)
*G06F 3/048* (2013.01)
*G06F 9/44* (2006.01)

(52) U.S. Cl.
CPC ............ *G06F 3/048* (2013.01); *G06F 9/4446* (2013.01); *G06F 17/30864* (2013.01)

(58) Field of Classification Search
CPC ................. G06F 17/30864; G06F 9/4446
USPC ....... 707/769, 721, 723, 725, 726, 727, 738, 707/748, 758, 768, E17.098, E17.137, 913, 707/915, 917; 715/708, 705
See application file for complete search history.

(56) References Cited

U.S. PATENT DOCUMENTS

| 7,543,232 | B2 |   | 6/2009 | Easton |   |
|---|---|---|---|---|---|
| 7,594,176 | B1 | * | 9/2009 | English | G06F 9/4446 706/50 |
| 7,849,405 | B1 | * | 12/2010 | Coletta | G06F 9/4446 715/708 |
| 7,933,926 | B2 | * | 4/2011 | Ebert | 707/793 |
| 8,160,983 | B2 | * | 4/2012 | Fitzmaurice | G06F 9/4446 706/45 |
| 8,271,410 | B2 | * | 9/2012 | Fitzmaurice | G06N 99/005 706/15 |
| 8,983,989 | B2 | * | 3/2015 | Srikanth | G06F 17/3066 707/759 |

(Continued)

OTHER PUBLICATIONS

Office Action for U.S. Appl. No. 13/650,081, dated May 23, 2014.

(Continued)

*Primary Examiner* — Jean M Corrielus
(74) *Attorney, Agent, or Firm* — Artegis Law Group, LLP

(57) ABSTRACT

One embodiment of the present invention sets forth a technique for providing help content related to a software application to a user. The technique involves receiving a first discussion element associated with a first user and including textual input related to a first software application and first contextual information related to the first software application. The technique further involves receiving second contextual information associated with a second user and related to the first software application, determining a measure of correlation between the first contextual information and the second contextual information, determining that the first discussion element should be transmitted to the second user based on the measure of correlation, and transmitting the first discussion element to the second user.

22 Claims, 6 Drawing Sheets

(56) References Cited

U.S. PATENT DOCUMENTS

| | | | |
|---|---|---|---|
| 2005/0154557 A1* | 7/2005 | Ebert | 702/182 |
| 2006/0015480 A1* | 1/2006 | Conahan | G06F 17/30867 |
| 2006/0085750 A1 | 4/2006 | Easton | |
| 2009/0183237 A1 | 7/2009 | Cortes et al. | |
| 2009/0235168 A1 | 9/2009 | Dawson | |
| 2010/0131451 A1* | 5/2010 | FitzMaurice | G06N 99/005 706/54 |
| 2010/0131452 A1* | 5/2010 | FitzMaurice | G06N 99/005 706/54 |
| 2010/0251140 A1* | 9/2010 | Tipirneni | G06F 3/011 715/753 |
| 2010/0278453 A1* | 11/2010 | King | 382/321 |
| 2011/0131491 A1* | 6/2011 | Lu et al. | 715/708 |
| 2011/0196852 A1* | 8/2011 | Srikanth | G06F 17/3066 707/706 |
| 2012/0171654 A1* | 7/2012 | D'Angelo | G09B 7/00 434/322 |
| 2012/0173974 A1* | 7/2012 | Taylor | G06F 9/4446 715/705 |
| 2012/0198362 A1* | 8/2012 | Urban | G06F 9/4443 715/762 |
| 2012/0259845 A1* | 10/2012 | Matejka | G06F 17/30528 707/723 |
| 2012/0317481 A1* | 12/2012 | Armstrong | G06F 9/4446 715/707 |

OTHER PUBLICATIONS

Final Office Action for U.S. Appl. No. 13/650,081, dated Aug. 12, 2014.

Office Action for U.S. Appl. No. 13/650,081, dated Jan. 8, 2015.

\* cited by examiner

IN-PRODUCT QUESTIONS, ANSWERS, AND TIPS

CROSS-REFERENCE TO RELATED APPLICATIONS

This application claims benefit of U.S. Provisional Patent Application Ser. No. 61/547,658, filed Oct. 14, 2011, which is herein incorporated by reference in its entirety.

BACKGROUND OF THE INVENTION

1. Field of the Invention

The present invention generally relates to computer software, and, more specifically, to an approach for providing in-product questions, answers and tips relative to a software application.

2. Description of the Related Art

A wide variety of software applications are currently available to end-users, including computer-aided design (CAD) applications, computer graphics applications, animation applications, word processing applications, and computer programming applications, among others. Many of these software applications allow an end-user to interact with the software application via a graphical end-user interface (GUI). Conventional GUIs often provide the end-user with access to a set of tools that can be used to perform various operations within a workspace generated by the software application. For example, a CAD application could provide a set of drawing tools that could be used to create complex designs within a drawing workspace generated by the CAD application. In such a case, each tool in the set of tools would be represented within the GUI with an icon that the end-user could select in order to use the tool.

Despite advances in application designs that allow end-users to more easily operate complex applications, learning how to use such applications can still be problematic. More complex applications, for example, like the CAD application described above, often include thousands of commands or functions from which to choose and many ways for an end-user to combine these functions into workflows. Consequently, with unfamiliar aspects of complex applications, even expert end-users may require assistance.

In an effort to provide users with guidance regarding how to use unfamiliar aspects of a software application, the application may include a static database of preloaded help content which is infrequently updated by the application developer. However, if a specific issue encountered by a user is not addressed in the help database, the user must interrupt his or her workflow to seek outside resources for a solution.

Online support forums, which enable users to post questions and receive answers from others, are one type of outside resource available to users. However, online support forums can be difficult to navigate and lack conciseness, with relevant answers often being buried within lengthy "off-topic" discussions. Further, such forums are not optimized to enable users to resolve specific command-level issues. As a result, within a lengthy forum topic or "thread," a particular question may be asked and answered numerous times, since users are either unable or unwilling spend time navigating and searching the forum for previously resolved issues. Moreover, when using an online support forum, accurately formulating questions using proper terminology and necessary images and/or attachments can be difficult and cumbersome for users. These different factors oftentimes combine to discourage many users from posting questions and answers on support forums, due to the time and effort required to do so.

As the foregoing illustrates, there is a need in the art for a more effective way for users to submit questions and provide answers and tips to other users within the software community.

SUMMARY OF THE INVENTION

One embodiment of the present invention sets forth a method for providing help content related to a software application to a user. The method involves receiving a first discussion element associated with a first user and including textual input related to a first software application and first contextual information related to the first software application. The method further involves receiving second contextual information associated with a second user and related to the first software application, determining a measure of correlation between the first contextual information and the second contextual information, determining that the first discussion element should be transmitted to the second user based on the measure of correlation, and transmitting the first discussion element to the second user.

Further embodiments provide a non-transitory computer-readable medium and a computing device to carry out the method set forth above.

Advantageously, the disclosed technique enables users to efficiently prepare, transmit, and receive relevant learning resources, such as discussion topics related to application commands, in order to troubleshoot application issues and facilitate opportunistic learning.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
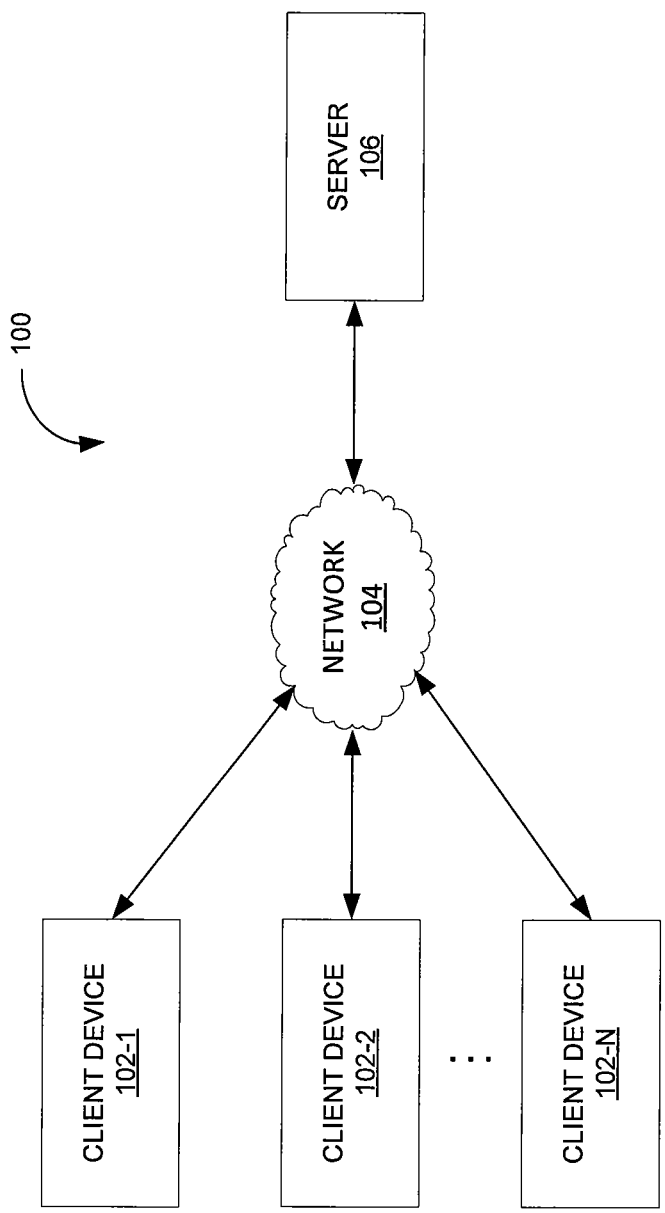
FIG. 1 illustrates a system configured to implement one or more aspects of the present invention.

FIG. 1 illustrates a system 100 configured to implement one or more aspects of the present invention. As shown, the system 100 includes, without limitation, one or more client devices 102 configured to transmit data to and receive data from a server 106 through a network 104. More specifically, as discussed in greater detail below in conjunction with FIG. 2, each client device 102 executes at least one software application and a context engine. The context engine within each client device 102 receives contextual information indicating the type(s) of commands being issued by the user of the client device 102. Additionally, each context engine may transmit this contextual information over the network 104 to the server 106 and/or may associate the contextual information with a discussion element generated by the context engine. The discussion element then may be transmitted to the server 106.

In the exemplary embodiment described herein, a first context engine of client device 102-1 may receive first contextual information related to a first user's activities within the software application. Contextual information may include, for example, the commands being issued by a user within a software application and/or the particular characteristics of the user's work product modified by those commands. The first context engine may then generate a discussion element, associate the first contextual information with the discussion element, and transmit the discussion element to the server 106. The discussion element includes user-generated or application-generated help content related to the software application. The server 106 is configured to store discussion elements received from the client devices 102 in a database.

Next, a second context engine of client device 102-2 may receive second contextual information related to a second user's activities within the software application. The second context engine may then transmit the second contextual information to the server 106. As is described in greater detail below in conjunction with FIG. 2, upon receiving the second contextual information, the server 106 determines a measure of correlation between the first contextual information and the second contextual information. As an example, a measure of correlation may be determined based on whether the first and second contextual information indicate that the first and second users have issued the same or similar commands within the same software application. Based on the determined measure of correlation, the server 106 may transmit the discussion element associated with the first contextual information to the context engine of client device 102-2. The discussion element is then displayed to the second user in order to provide help content relevant to the activities of the second user within the software application.

The client device 102 may be any type of electronic device that enables a user to connect to (e.g., via the Internet, a local area network (LAN), an ad hoc network, etc.) and communicate with one or more other users. Exemplary electronic devices include, without limitation, desktop computing devices, portable or hand-held computing devices, laptops, tablets, smartphones, mobile phones, personal digital assistants (PDAs), etc. In one embodiment, at least one client device 102 may be configured to provide the functionality of the server 106, thereby eliminating the necessity of a separate and dedicated server 106. In such an embodiment, the correlation engine that resides in the server 106, as described below in conjunction with FIG. 2, may instead reside within one or more client devices 102, and the different client devices 102 of FIG. 1 may communicate directly with each other, for example, via a peer-to-peer protocol.

Figure 2:
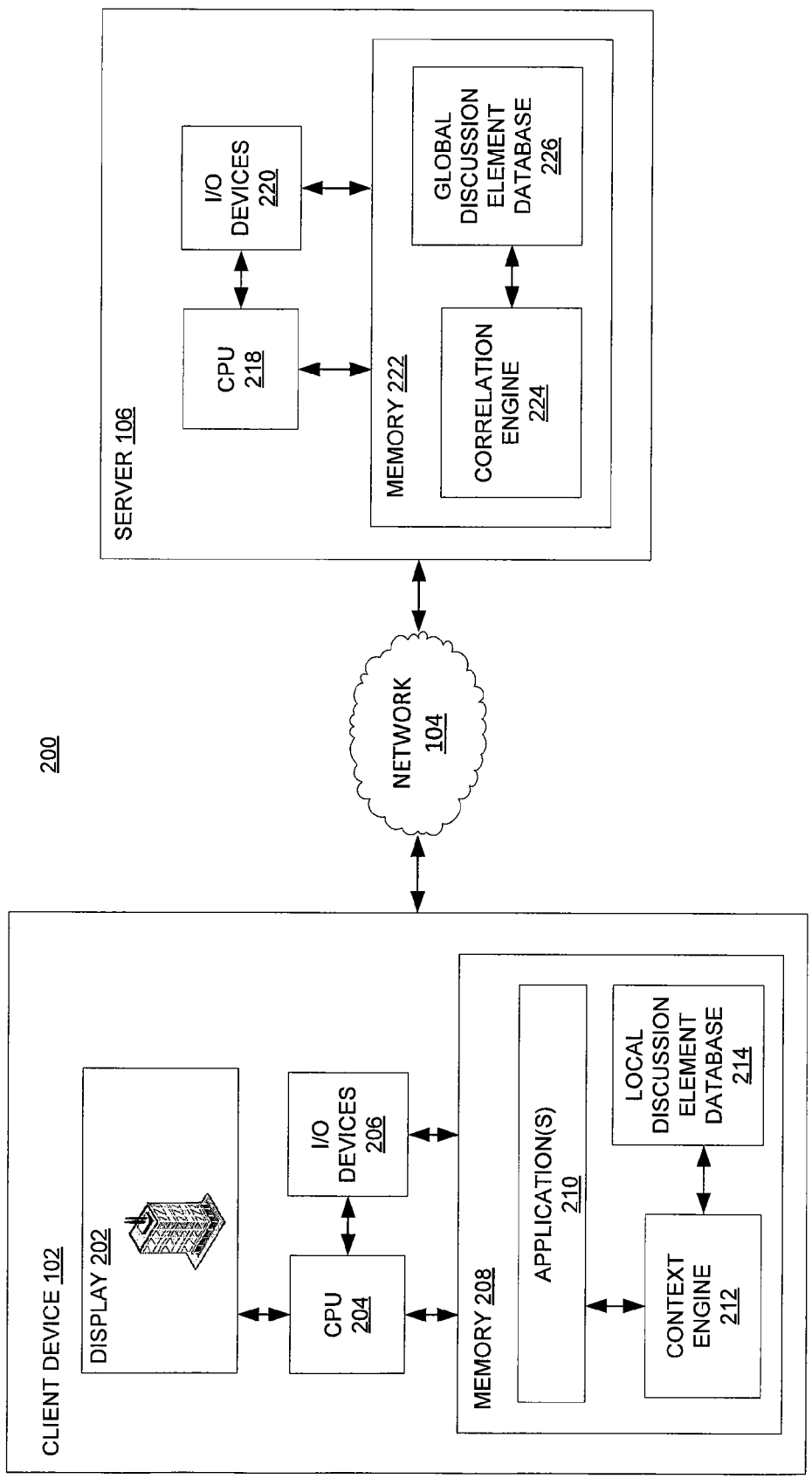
FIG. 2 sets forth more detailed illustrations of one of the client devices and the server of FIG. 1, according to one embodiment of the invention.

FIG. 2 sets forth more detailed illustrations of one of the client devices 102 and the server 106 of FIG. 1, according to one embodiment of the invention. As shown, the client device 102 includes, without limitation, a display 202, a central processing unit (CPU) 204, one or more input/output (I/O) devices 206, and a memory 208. The memory 208 is configured to store software application(s) 210, a context engine 212, and a local discussion element database 214. The CPU 204 is configured to execute the software application(s) 210 and the context engine 212. The software application 210 may be any type of software application. However, in the exemplary embodiment described herein, the software application 210 is a computer-aided design (CAD) application. A user of the CAD application may issue commands through an I/O device 206, for example, in order to prepare or modify design documents associated with the CAD application.

The context engine 212 receives contextual information indicating, for example, the type(s) of commands being issued within the CAD application and/or the particular characteristics of the user's work product modified by those commands. The context engine 212 may then transmit this contextual information to the server 106. Additionally, the context engine 212 may generate a discussion element, store help content in the discussion element, and associate the contextual information with the discussion element. The discussion element is further transmitted to a queue in the local discussion element database 214 in the client device 102, or transmitted over the network 104 to the server 106, where the discussion element is stored in the global discussion element database 226 in the server 106.

Contextual information may include, for example, the type(s) of commands issued by the user to the software application 210, the order in which commands are issued to the software application, and/or the type of project (e.g., the type of design) being modified by the software application. Such contextual information may be explicitly specified by the user and received by the context engine 212, or the context engine 212 may monitor and/or record a user's activities within an application to receive the contextual information. Contextual information may also indicate which discussion elements a user previously viewed and/or a rating that the user or similar users assigned to the discussion elements or related discussion elements.

The generation of a discussion element may be initiated by the context engine 212 or by a user. For example, as described below in conjunction with FIG. 4, a user may wish to generate a discussion element which includes help content related to a particular application command in order to provide assistance to one or more other users. The application commands to which the help content is relevant and/or one or more types of help content may then be associated with the discussion element. Help content may be prepared by the user via textual input, for example, by typing a question, typing an answer to a question, or a preparing a tip or description regarding a particular application command. Help content also may be prepared by recording the user's voice or by recording video of the user or of the user operating the software application. For example, including live or prerecorded video within the help content may enable other users to view the user perform a particular task within the software application. Such instructional videos are often referred to as troubleshooting videos, demonstrations, or walkthroughs. The context engine 212 may further enable the user to associate other types of multimedia content with the discussion element, such as application screenshots, project files, command logs, and the like.

Although FIG. 2 shows the context engine 212 as a separate software module, it is also contemplated that the context engine 212 may be integrated into the software application 210 or offered as a software add-on or plug-in for the application 210. When configured as a separate software module, the context engine 212 may be capable of communicating with and receiving information from a variety of different software applications 210.

As also shown, the server 106 includes, without limitation, a central processing unit (CPU) 218, one or more input/output (I/O) devices 220, and a memory 222. The memory 222 is configured to store a correlation engine 224 and a global discussion element database 226. The CPU 218 is configured to execute the correlation engine 224, which receives contextual information from a client device 102 and determines a measure of correlation between this contextual information and the contextual information associated with one or more discussion elements stored in the global discussion element database 226. Based on the determined measure(s) of correlation, the server 106 may transmit one or more discussion element(s) to the context engine 212 of client device 102.

Upon receiving the discussion element(s), the context engine 212 may display the discussion element(s) to the user (e.g., by displaying the help content and/or contextual information associated with the discussion element(s) to the user). Additionally, the context engine 212 may store the discussion element(s) in the local discussion element database 214 such that the discussion element(s) are available to the user at a later time (e.g., when the client device 102 is offline). Further, caching one or more discussion elements in the local discussion element database 214 may decrease the latency associated with presenting the discussion elements and associated help content to the user, enabling the discussion elements to be presented to the user as previews or tooltips.

When a user of a client device 102 is presented with a discussion element, the user may view the help content associated with the discussion element, and/or the user may choose to contribute to the help content. For example, the user may prepare a textual or multimedia description to expand or improve upon the help content included in the discussion element. Further, the user may prepare an answer/solution to a question/problem posed by another user in the help content, or the user may prepare an additional question to include in the help content. The user may also add any type of textual or multimedia content to the discussion element which illustrates or communicates the questions, answers, comments, tips, etc. included in the discussion element. Once the additional help content has been prepared, the content may be associated with the discussion element and stored in the global discussion element database 226 or any other networked server or database.

The context engine 212 associated with each client device 102 may be controlled by a user, or the context engine 212 may operate as a background process. When the context engine 212 is controlled by the user, the user may initiate a request for a discussion element by specifying the commands, types of projects, etc. for which the user would like to view help content. Additionally, a discussion element request may be initiated when the user specifies a search query for a particular category of help content. The server 106 then responds with one or more discussion elements relevant to the command, type of project, etc. and/or relevant to the search query submitted by the user. The context engine 212 may further operate automatically or semi-automatically by detecting contextual information related to the user's activities within a software application and transmitting the contextual information to the server 106. The server 106 then responds with one or more discussion elements which include help content relevant to the user's activities. The discussion elements may then be presented to the user and/or stored in the local discussion element database 214 for later viewing.

Returning now to the server 106, the correlation engine 224 may execute one or more algorithms to determine a measure of correlation between the contextual information received from a client device 102 and the contextual information associated with the discussion element(s) stored in the global discussion element database 226. Useful algorithms may determine a measure of correlation based on, for example, the N most recent commands issued by the user(s) (e.g., N=5, 10, 20, and so on), the type of project modified by the user(s), a rating of the discussion element, a rating of the user with whom the discussion element is associated, the date on which the discussion element was generated or received by the server 106, and/or whether the user has viewed the discussion element or similar discussion elements. The correlation engine 224 may further assign a ranking or relevance score with the discussion element(s) based on the determined measure(s) of correlation. The correlation engine 224 also may execute one or more of these algorithms to determine a measure of correlation between the discussion elements stored in the global discussion element database 226 and a search query received from a client device 102. After determining one or more measures of correlation, the correlation engine 224 transmits the discussion element(s) determined to be most relevant to the contextual information or search query to the client device 102.

Upon receiving the discussion elements, the context engine 212 may display the discussion elements to the user in an order which reflects the ranking or relevance score of each discussion element.

Figure 3:
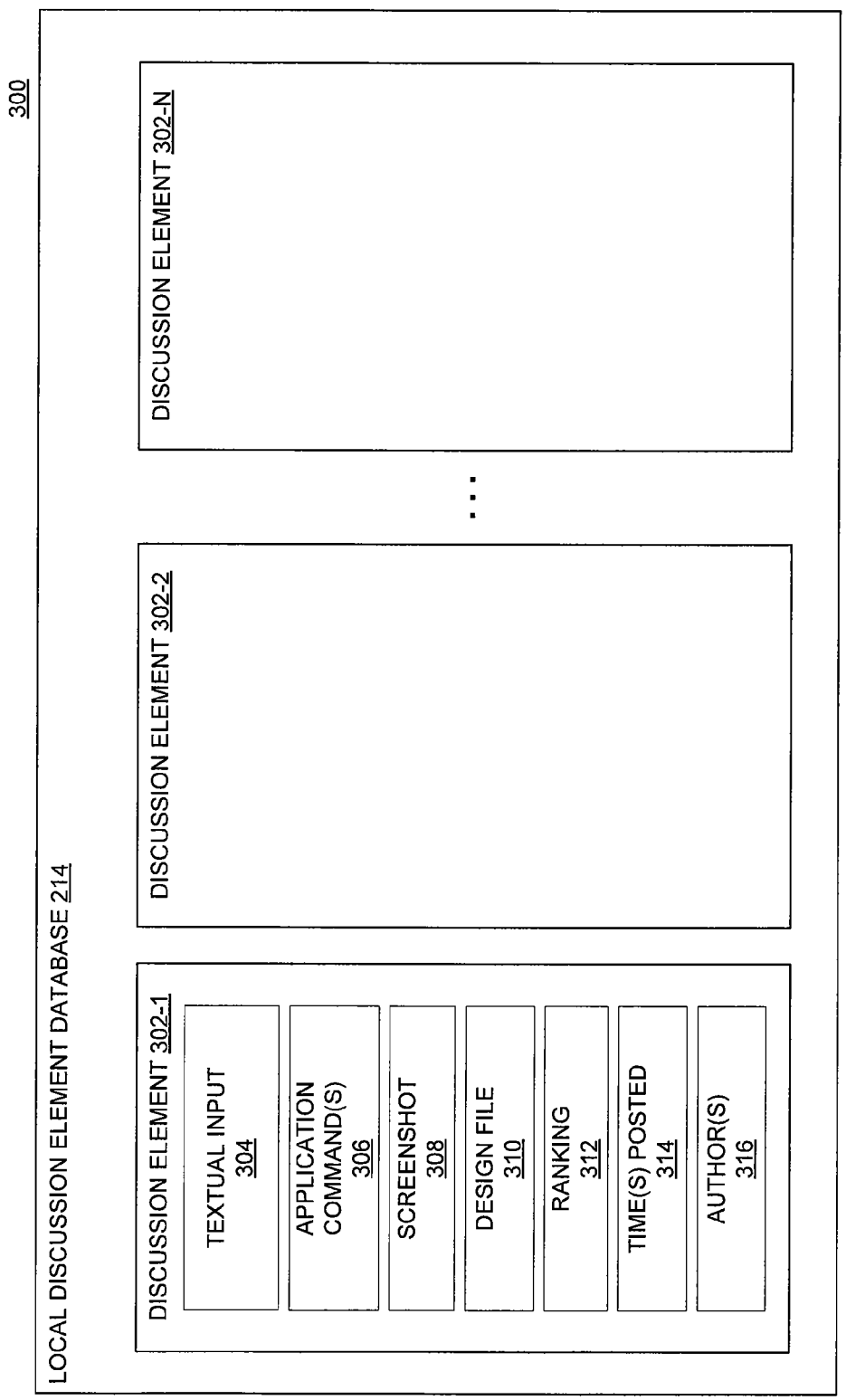
FIG. 3 sets forth a more detailed illustration of exemplary local discussion element database of FIG. 2, according to one embodiment of the invention.

FIG. 3 sets forth a more detailed illustration of exemplary local discussion element database 214 of FIG. 2, according to one embodiment of the invention. The local discussion element database 214 includes one or more discussion elements 302, each of which are configured to store help content and other types of information related to a software application. For example, discussion element 302-1 includes information such as, without limitation, textual input 304, one or more application commands 306, a screenshot 308, a design file 310, a ranking 312, time(s) posted 314, and author(s) 316.

The textual input 304 field may include a description, such as a question, answer, or tip, related to a particular aspect of a software application. For instance, the textual input 304 may include a specific question regarding how to perform an operation or command in a software application. The textual input 304 also may include answers contributed by other users to a question included in the discussion element 302. Additionally, the textual input 304 may include application characteristics or statistics which provide context and enable other users to better understand the help content included within the discussion element 302.

The application command(s) 306 may include one or more commands that are relevant to the help content included in the discussion element 302. The application command(s) 306 also may include a series of commands intended to provide instruction to other users regarding how to accomplish a task in a software application. The application command(s) 306 may be specified by a user, or the commands may be automatically generated by a software application, for instance, by monitoring and recording a series of commands issued by a user in the software application.

The screenshot 308 may be an image of the application working environment, or an image of a specific project or area of a project. The design file 310 may include the project to which the discussion element 302 is relevant, enabling other users to view detailed project information regarding a question, answer, or tip. Providing a design file 310 may further enable other users to attempt to solve a problem within the design file 310 or to practice performing application commands within the design file 310. The ranking 312 field may include a score based on whether the user (or other users) considered the discussion element 302 to be important, useful, relevant, etc. Further, the ranking 312 may reflect a measure of correlation determined by the correlation engine 224. The time(s) posted 314 field may include time information which reflects the time at which the discussion element 302 was posted or created, the time(s) at which one or more responses were added to the discussion element 302, the time(s) at which one or more types of help content were added to the discussion element 302, and the like. The author(s) 316 field may include the names or user account identifiers of the person(s) who initially created or posted the discussion element 302 and/or the names or user account identifiers of those who subsequently contributed to the discussion element 302. Such information may be used by one or more algorithms executed by the context engine 212 and/or the correlation engine 224. Each discussion element 302 may further include any other type of information relevant to a particular question, answer, tip, etc. included within or associated with the discussion element 302.

Figure 4:
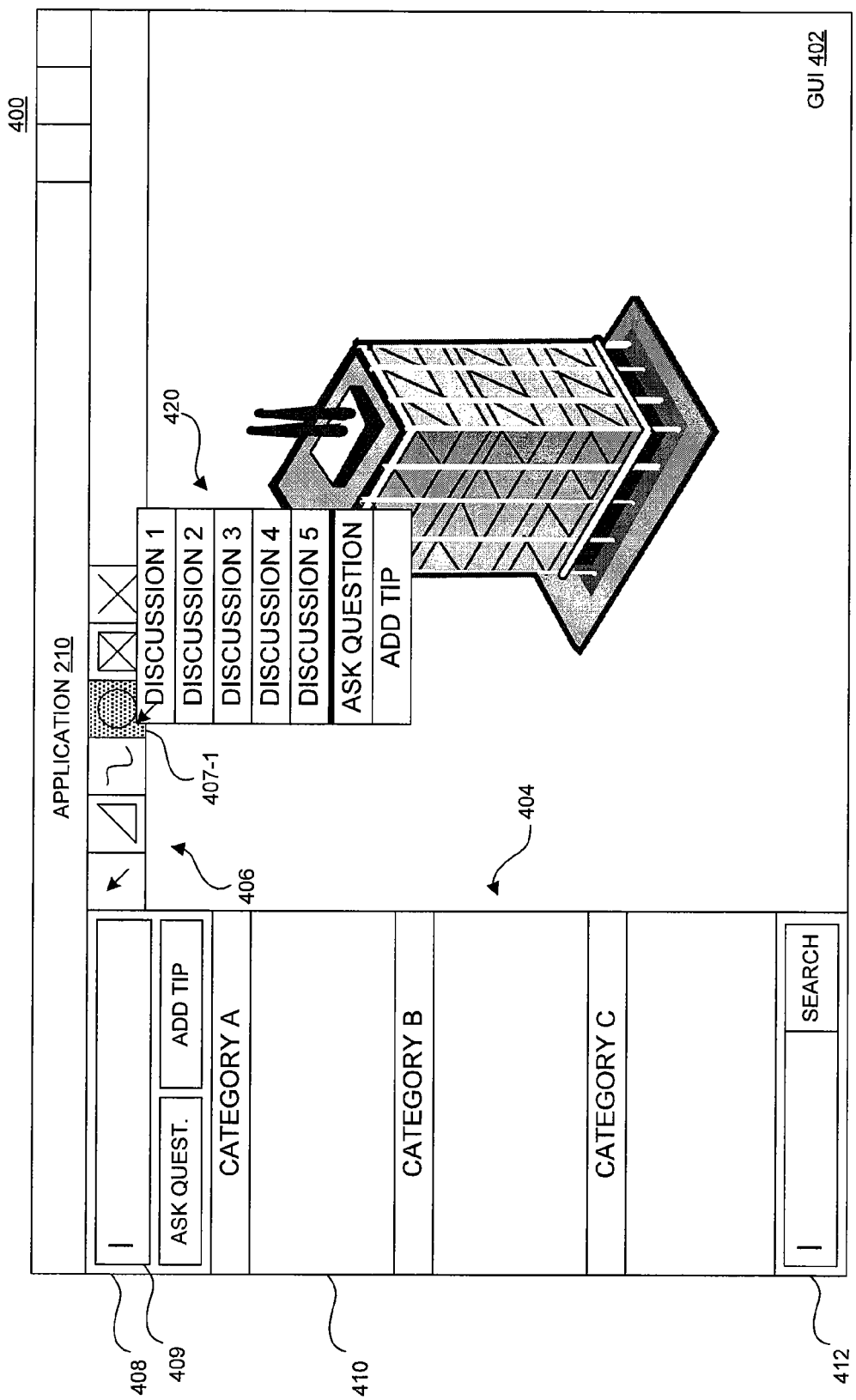
FIG. 4 illustrates a software application executing on one of the client devices of FIG. 2, according to one embodiment of the invention.

FIG. 4 illustrates a software application 210 executing on one of the client devices 102 of FIG. 2, according to one embodiment of the invention. As shown, the software application 210 includes a graphical user interface (GUI) 402, which allows a user to interact with the software application 210. The GUI 402 further enables the user to interact with the context engine 212 in order to submit a request for a discussion element 302 to the correlation engine 224, view help content associated with a discussion element 302, and/or modify information associated with a discussion element 302. Although the context engine 212 and correlation engine 224 are described in conjunction with the GUI 402 illustrated in FIG. 4, persons skilled in the art will understand that other implementations of the context engine 212 and correlation engine 224 are within the scope of the invention.

When first executing the application 210 and the context engine 212, a user may create a user account, or a user account may be automatically created for the user. The user account credentials may then be saved and automatically loaded each time the user executes the application 210 and context engine 212.

As shown in FIG. 4, the GUI 402 allows a user to select from a variety of commands 407 from a command toolbar 406 for modifying a document. The GUI 402 also allows the user to select from a variety of discussion functions 404 in order to contribute help content, locate relevant help content, and participate in application-related or command-related discussions with other users. The discussion functions 404 may include, for example, a post function 408, a view function 410, and a search function 412.

The post function 408 enables a user to generate a new discussion element 302 or contribute to an existing discussion element 302. Textual input 304 to be included in a discussion element 302 may be inputted into an input field 409. In the exemplary embodiment illustrated in FIG. 4, the input field 409 is designed to be relatively small to encourage users to provide concise questions, answers, and tips. Further, a title field may be omitted from each post in order to encourage users to focus on providing more useful content in the input field 409.

The input field 409 of the post function 408 may be used for a variety of purposes. For example, a question or tip inputted into the input field 409 may be used to generate a new discussion element 302. Once the new discussion element 302 is generated, the user may further be presented with a dialog box (e.g., a top-level modeless dialog box) in which supporting information and help content may be specified or prepared.

In one embodiment, the dialog box may include a larger input field in which a user can include a more detailed description of a question or tip. The dialog box may also include an option to specify one or more commands 407 which the user considers relevant to the discussion element 302. In order to efficiently specify relevant commands 407, the context engine 212 may monitor or record one or more commands 407 issued by the user and present a listing of the command(s) 407 to the user when a new discussion element 302 is generated. The user may then add or remove commands 407 from the listing of commands 407 provided by the context engine 212.

In another embodiment, after being presented with the dialog box, the user may choose one or more relevant commands 407 by selecting the command(s) 407 from the command toolbar 406 in the GUI 402. For instance, the dialog box may be modeless, enabling the user to attempt to perform the task for which the user would like to submit a question or tip. Through the use of a modeless dialog box, the commands 407 are automatically captured by the context engine 212 and included in the relevant commands 407 list.

The dialog box may further present the user with options to attach multiple data formats, for example, project screenshots, the project file itself, or a log including project history (e.g., command history). The dialog box may include different methods by which the user can quickly and easily include a screenshot. For example, one method may enable the user to draw a box around a relevant area of the screen of which the user wishes to create a screenshot. Another method may include an option to include only certain application 210 windows in a screenshot (e.g., the design window, command toolbar(s), etc.) in order to avoid sharing sensitive or confidential information with other users. The dialog box may further enable the user to markup a screenshot in order to emphasize or highlight areas of the screenshot which the user feels are most relevant to a discussion. For example, the dialog box may provide the user with drawing tools to annotate, include comments, or otherwise mark up the screenshot. Other methods may use check boxes to indicate whether a screenshot, project file, or other data formats are to be included in or associated with a discussion element 302. A copy of each screenshot, project file, or other data format may also be saved locally for later reference.

As illustrated in the exemplary embodiment of FIG. 4, the generation of a discussion element 302 relevant to a particular command 407 may be initiated from a context menu 420. For example, a user may place a mouse cursor or input device (e.g., stylus, finger, etc.) over a command 407-1, expose a context menu 420 (e.g., by right-clicking, long-pressing, etc.), and select an option to ask a question or add a tip with respect to the command 407-1. A dialog box may then be presented to the user, as described above, with the selected command 407-1 automatically specified in the relevant command(s) listing. The user may then input the question, tip, or other type of comment regarding the command 407-1.

The view function 410 enables a user to view discussion elements 302, such as questions and tips submitted by other users. The discussion elements 302 may be categorized. Although any number of categories may be implemented. Several exemplary categories include unanswered or "open" questions, answered or "resolved" questions, tips, image-enabled discussion elements 302, popular discussion elements 302, recently viewed discussion elements 302, and discussion elements 302 to which a user has recently contributed a question, answer, tip, data type, etc. Discussion elements 302 may further include icons indicating the type of discussion element 302 (e.g., a question or tip), whether the user has already viewed the discussion element 302, which user(s) contributed to the discussion element 302, whether a problem presented in a discussion element 302 has been solved, and whether the discussion element 302 is recommended by others.

One or more algorithms may be executed by the context engine 212 to determine in which order (or whether) discussion elements 302 are presented in each category within the view function 410 window. In an exemplary embodiment, two algorithms may be used. The first algorithm sorts all discussion elements 302 in a particular category by the date on which the discussion element 302 was last updated. Using such an algorithm decreases the likelihood that outdated discussion elements 302 are displayed. The second algorithm looks at contextual information associated with the application 210 and calculates a relevance score {S} for each discussion element 302 as shown below in Equation 1. The exemplary relevance score {S} shown in Equation 1 is a function of the topic {t}, the user {u}, and the ten most recently used commands {C}. For instance, the second algorithm weights topics which include some or all of the ten most recently used commands {C} issued by the user. The second algorithm further takes into account whether the user has seen all of the posts in a discussion element 302, whether the user is an author of the discussion element 302, whether other users have found the discussion element 302 to be interesting (or have otherwise ranked the discussion element 302 in a positive manner), and how many views the discussion element 302 has received. The results produced by each of the two algorithms may then be interleaved to provide the user with useful discussion elements 302. In other embodiments, any number of different algorithms can be used to determine which discussion elements 302 are displayed in the view function 410 window.

$$S(t, u, C) = u \cdot hasNotSeen(\forall\ t) * 11 + u \cdot author(t) * 25 + u \cdot foundInteresting(t) * 17 + \sum_{C}(t \cdot uses(c_i) * 3) + \sum_{\forall u}(u_i \cdot hasSeen(t) * 1.1) + \sum_{\forall u}(u_i \cdot foundInteresting(t) * 4.1)$$ (Eq. 1)

The context engine 212 may continuously update the listing of discussion elements 302 provided in each category. For example, the listing may be updated once every minute. Additionally, in order to decrease the degree to which updating the listing interferes with a user's ability to view the discussion elements 302, the listing may be updated only when the cursor of input device has been moved away from the view function 410 window for a period of time (e.g., 3-5 seconds).

When viewing a discussion element 302 in the view function 410 window, the user may place a cursor or input object over a discussion element 302 to view a tooltip and/or preview of the discussion element 302. The tooltip or preview may include a short description of the discussion element 302 (e.g., textual input 304), timestamp(s) associated with the discussion element 302, relevant commands (e.g., application command(s) 306), a thumbnail or screenshot 308 associated with the discussion element 302, a ranking 312 of the discussion element 302, the user(s) who contributed to the discussion element 302, and/or other types of information relevant to the application(s) or command(s) discussed in the discussion element 302. The user may further provide a ranking 312 of a discussion element 302 within the view function 410 window.

Upon selecting a discussion element 302, the content of the discussion element 302 may be displayed in the view function 410 window. The user may then view the textual input 304, data formats (e.g., 306, 308, 310, etc.), and contextual information associated with the discussion element 302. The user may further choose to contribute to the discussion element 302, at which the point the user may be provided with a dialog box. The user may then input into the dialog box a comment, solution, question, tip, etc. and attach one or more screenshots and relevant data formats as described above.

Once a user responds to a question presented in a discussion element 302, the response may be included in the discussion element 302 and transmitted to the user who initially posed the question. In an exemplary embodiment, the user who initially posed the question is further presented with a option (e.g., a check box or a dialog box) to indicate whether the question has been sufficiently answered. If the user who initially posed the question feels that the question has not been sufficiently answered, the discussion element 302 may be re-marked (or remain marked) as an unanswered question.

The view function 410 further provides users with the opportunity to provide a ranking 312 of discussion elements 302. For example, a user may provide a ranking 312 of a discussion element 302 if he or she feels that the content of the discussion element 302 is useful or is not useful. Both answered and unanswered discussion elements 302 may be ranked. By providing a positive ranking 312 for a discussion elements 302 which contains an unanswered question, the question may be answered more quickly. For instance, a positive ranking 312 for a particular discussion element 302 may make other users more likely to view and respond to the discussion element 302. Additionally, a ranking 312 may be provided for individual questions, comments, answer, tips, etc. within each discussion element 302. Ranking 312 may also be provided indirectly, for example, by tracking the number of views or responses a particular discussion element 302 receives.

As illustrated in the exemplary embodiment of FIG. 4, one or more discussion elements 302 which are relevant to a particular command 407-1 may be viewed by placing a mouse cursor or input device over the command 407-1 and exposing a context menu 420. A listing may which includes discussion elements 302 relevant to the command 407-1 may then be presented to the user. The discussion elements 302 included in the context menu 420 associated with each command 407 may be determined by any number of criteria. Several exemplary criteria include ranking 312, application version, user command history, and user experience level. For example, highly ranked discussion elements 302 may be shown near the top of the listing, while poorly ranked discussion elements 302 may be shown near the bottom of the listing or not at all. In addition, user command history may be compared to the application command(s) 306 included in each discussion element 302 to more accurately determine relevance. Further, a user's experience level may taken into account when determining which discussion elements 302 are most appropriate—advanced users may be shown discussion elements 302 which include advanced topics, while novice users may be shown discussion elements 302 which include topics related to basic command functionality.

The search function 412 enables a user to search for discussion elements 302 having specific characteristics. For example, the user may specify a textual search query, and/or the user may specify criteria, such as commands, data formats, etc. in which the user is interested. The search query and specified criteria are then transmitted to the server 106 and processed by the correlation engine 224, as described above with respect to FIG. 2. The results of a search may be provided in the view function 410 window.

Figure 5:
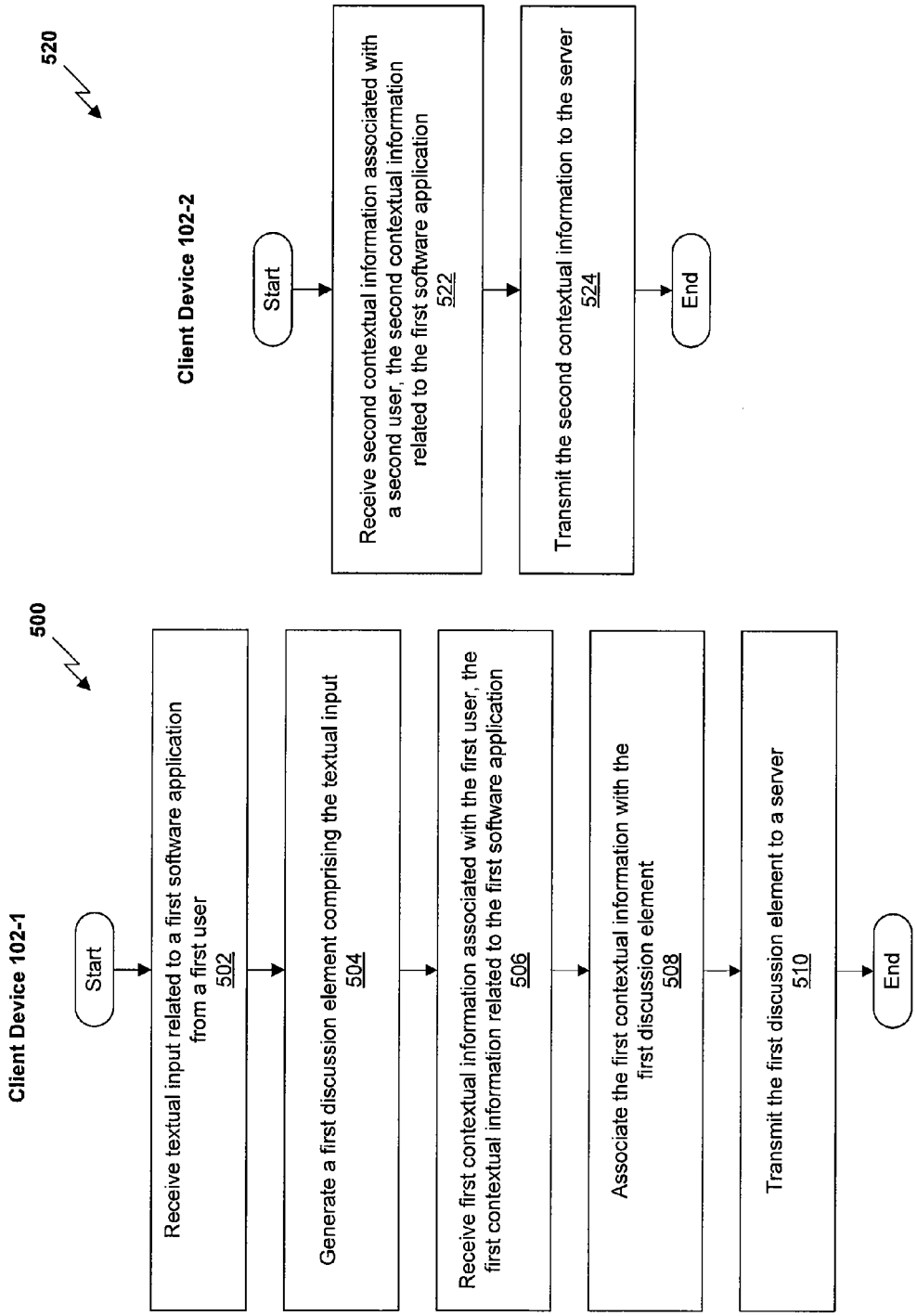
FIG. 5A is a flow diagram of method steps for generating and transmitting a discussion element, according to one embodiment of the present invention.
FIG. 5B is a flow diagram of method steps for receiving and transmitting contextual information, according to another embodiment of the present invention.

FIG. 5A is a flow diagram of method steps for generating and transmitting a discussion element 302, according to one embodiment of the present invention. FIG. 5B is a flow diagram of method steps for receiving and transmitting contextual information, according to another embodiment of the present invention. Although both sets of method steps are described in conjunction with FIGS. 1-4, persons skilled in the art will understand that any system configured to perform either of the sets of method steps, in any order, falls within the scope of the present invention.

As shown in FIG. 5A, a method 500 begins at step 502, where textual input related to a first software application 210 is received from a first user. The textual input may be received by a first context engine 212-1 of client device 102-1, for example. At step 504, the first context engine 212-1 generates a first discussion element 302-1 and associates the textual input with the first discussion element 302-1. As an example, the textual input may be associated with the first discussion element 302-1 by storing the textual input in the first discussion element 302-1. At step 506, first contextual information associated with the first user and related to the first software application 210 is received by the first context engine 212-1.

Next, at step 508, the first contextual information may be associated with the first discussion element 302-1, for example, by storing the first contextual information in the first discussion element 302-1. The first discussion element 302-1 is then transmitted to a server 106 at step 510.

As shown in FIG. 5B, a method 520 begins at step 522, where second contextual information associated with a second user and related to the first software application 210 is received by a second context engine 212-2. The second context engine 212-2 may be executing on client device 102-2, for example. At step 524, the second context engine 212-2 transmits the second contextual information to the server 106.

The first and second contextual information may be related to the first or second user's activities within the first software application 210 and may include, for example, one or more commands issued by the user within the first software application 210 and/or particular characteristics of the user's work product modified by those commands. Further, the contextual information may include any other type(s) of contextual information described in the present application.

Figure 6:
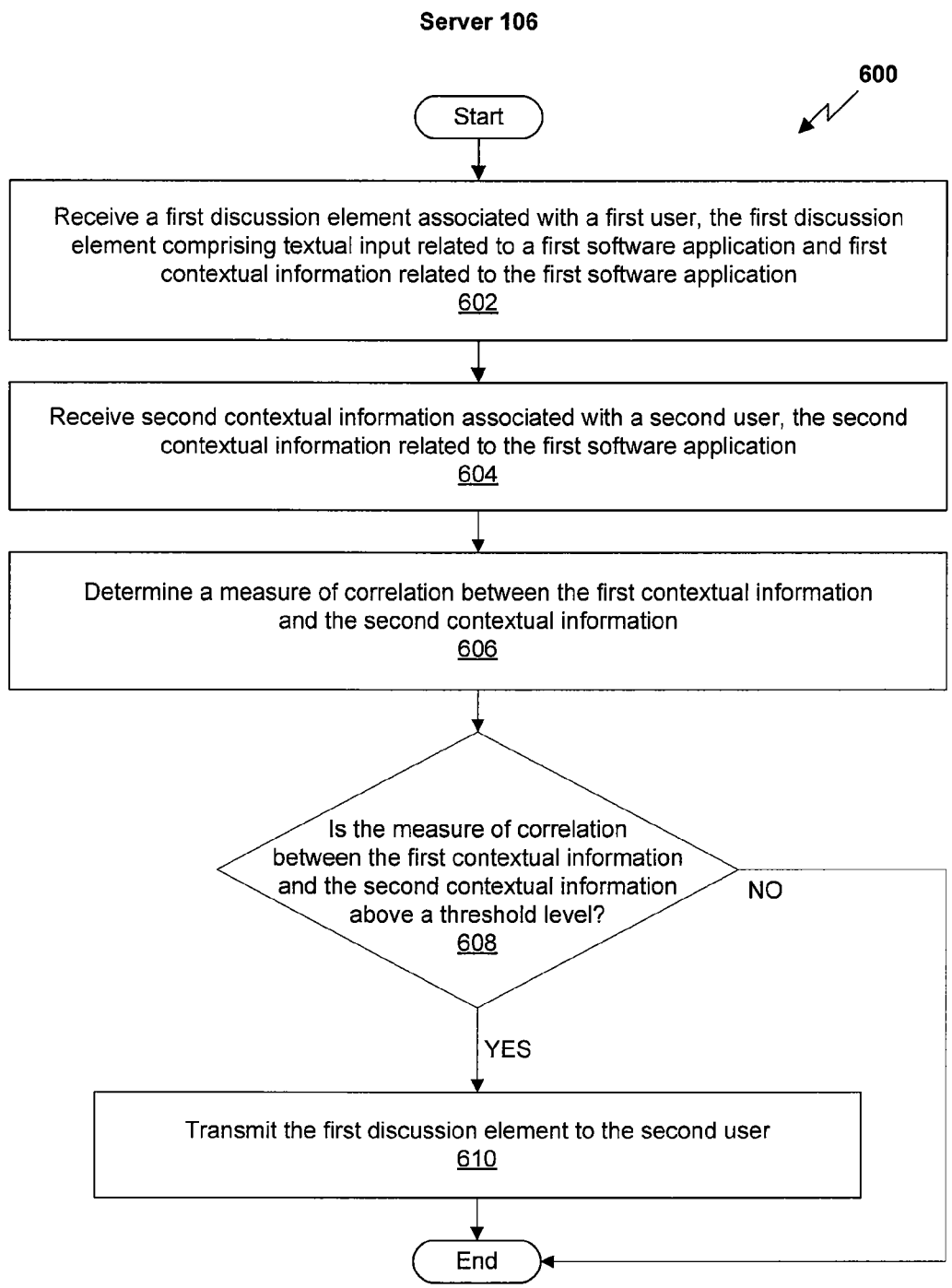
FIG. 6 is a flow diagram of method steps for providing a discussion element to a user based on contextual information received from the user, according to one embodiment of the present invention.

FIG. 6 is a flow diagram of method steps for providing a discussion element 302 to a user based on contextual information received from the user, according to one embodiment of the present invention. The method steps illustrated in FIG. 6 may be performed in conjunction with the method steps illustrated in FIGS. 5A and 5B, or the method steps illustrated in FIG. 6 may be performed independently. Further, although the method steps are described in conjunction with FIGS. 1-4, persons skilled in the art will understand that any system configured to perform the method steps, in any order, falls within the scope of the present invention.

As shown, a method 600 begins at step 602, where a first discussion element 302-1 associated with a first user (e.g., a user of client device 102-1) is received by a server 106. The first discussion element 302-1 may include textual input and contextual information related to a first software application 210. At step 604, second contextual information associated with a second user (e.g., a user of client device 102-2) and related to the first software application is received by the server 106. Next, at step 606, a correlation engine 224 executing on the server 106 determines a measure of correlation between the first contextual information and the second contextual information.

At step 608, the correlation engine 224 determines whether the measure of correlation between the first contextual information and the second contextual information is above a threshold level. If the measure of correlation between the first contextual information and the second contextual information is above a threshold level, the first discussion element 302-1 is transmitted and displayed to the second user at step 610. If the measure of correlation between the first contextual information and the second contextual information is not above a threshold level, the first discussion element 302-1 is not displayed to the second user. Further, in another embodiment, if the measure of correlation between the first contextual information and the second contextual information is not above a threshold level, the first discussion element 302-1 is neither transmitted nor displayed to the second user.

As discussed above in conjunction with FIG. 1, one or more of the client devices 102 may perform the functions of the server 106, thereby eliminating the need for a separate and dedicated server 106. In such an embodiment, the discussion element 302-1 may be transmitted from a first client device 102-1 to a second client device 102-2 which is acting as a server and which includes a correlation engine 224 and/or global discussion element database 226. In yet another embodiment, the context engine 212, the correlation engine 224, and the global discussion database 226 may be implemented in a cloud computing-type of configuration. In such a configuration, the client devices 102 may act as terminal devices, and the server 106 may execute both the context engine 212 and the correlation engine 224. One or more context engines 212 may monitor the application activity of one or more users, transmit discussion elements 302 to the global discussion element database 226, and/or transmit contextual information to the correlation engine 224. Further, the global discussion element database 226 may reside on the same server 106 as the context engine 212 or on a different server 106 than the context engine 212.

In sum, a first client device generates a discussion element which includes help content and contextual information indicating the application command(s) to which the help content is related. The client device then transmits the discussion element to the server, which receives the discussion element and stores the discussion element in a database. A correlation engine in the server further receives contextual information from one or more other client devices and determines a measure of correlation between this contextual information and the contextual information associated with the discussion element. Based on the determined measure of correlation, the discussion element may be transmitted to and displayed on the other client device(s).

One advantage of the techniques described herein is that a user is efficiently provided with relevant learning resources, such as discussion topics related to application commands being executed by the user, which, among other things, lowers the transaction costs related to troubleshooting and facilitating opportunistic learning. Moreover, relevant learning resources are provided in a concise manner within the application that the user is currently using and for which the user is seeking assistance. In addition, the techniques described herein enable inexperienced users—who may be unfamiliar with the technical terminology required to effectively communicate an issue they have encountered with respect to a software application—to provide relevant and detailed information when seeking assistance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for providing help content related to a software application to a user, the method comprising:
receiving a first discussion element associated with a first user and comprising:
textual input from the first user and related to a first software application, and
first contextual information related to the first software application;
receiving second contextual information associated with a second user and related to the first software application;
determining, via a processing unit, a measure of correlation between the first contextual information and the second contextual information; and
based on the measure of correlation, determining that the first discussion element is to be transmitted to the second user and transmitting the first discussion element to the second user.

2. The method of claim 1, wherein the first contextual information comprises one or more application commands.

3. The method of claim 2, wherein the textual input comprises help content authored by the first user and associated with the one or more application commands.

4. The method of claim 3, wherein the one or more application commands comprise one or more drawing tools included in the first software application.

5. The method of claim 1, wherein determining comprises executing one or more correlation algorithms.

6. The method of claim 1, further comprising associating with the first discussion element at least one of an application screenshot or a user design file.

7. The method of claim 1, further comprising receiving the first discussion element from the second user, wherein the first discussion element has been modified by the second user.

8. The method of claim 7, wherein the first discussion element includes textual input and multimedia content added by the second user to create a modified first discussion element.

9. The method of claim 7, further comprising:
storing the modified first discussion element in a database; and
transmitting the modified first discussion element to the first user.

10. The method of claim 1, further comprising:
receiving a second discussion element associated with a third user, the second discussion element comprising textual input related to the first software application;
receiving a textual query from a fourth user;
determining a second measure of correlation between the textual input and the textual query; and
based on the second measure of correlation, determining that the second discussion element is to be transmitted to the fourth user.

11. The method of claim 1, further comprising:
receiving a second discussion element associated with a third user, the second discussion element comprising third contextual information related to the first software application, the third contextual information comprising one or more first application commands;
receiving a query from a fourth user, the query specifying one or more second application commands;
determining a third measure of correlation between the one or more first application commands and the one or more second application commands; and
based on the third measure of correlation, determining that the second discussion element is to be transmitted to the fourth user.

12. A non-transitory computer-readable storage medium including instructions that, when executed by a processing unit, cause the processing unit to provide help content related to a software application to a user, by performing the steps of:
receiving a first discussion element associated with a first user and comprising:
textual input from the first user and related to a first software application, and
first contextual information related to the first software application;
receiving second contextual information associated with a second user and related to the first software application;

determining, via a processing unit, a measure of correlation between the first contextual information and the second contextual information; and based on the measure of correlation, determining that the first discussion element is to be transmitted to the second user and transmitting the first discussion element to the second user.

13. The non-transitory computer-readable storage medium of claim 12, wherein the first contextual information comprises one or more application commands.

14. The non-transitory computer-readable storage medium of claim 12, wherein determining comprises executing one or more correlation algorithms.

15. The non-transitory computer-readable storage medium of claim 12, further comprising associating with the first discussion element at least one of an application screenshot or a user design file.

16. The non-transitory computer-readable storage medium of claim 12, further comprising receiving the first discussion element from the second user, wherein the first discussion element has been modified by the second user.

17. The non-transitory computer-readable storage medium of claim 16, wherein the first discussion element includes textual input and multimedia content added by the second user to create a modified first discussion element.

18. The non-transitory computer-readable storage medium of claim 16, further comprising:
    storing the modified first discussion element in a database; and
    transmitting the modified first discussion element to the first user.

19. The non-transitory computer-readable storage medium of claim 12, further comprising:
    receiving a second discussion element associated with a third user, the second discussion element comprising textual input related to the first software application;
    receiving a textual query from a fourth user;
    determining a second measure of correlation between the textual input and the textual query; and
    based on the second measure of correlation, determining that the second discussion element is to be transmitted to the fourth user.

20. The non-transitory computer-readable storage medium of claim 12, further comprising:
    receiving a second discussion element associated with a third user, the second discussion element comprising third contextual information related to the first software application, the third contextual information comprising one or more first application commands;
    receiving a query from a fourth user, the query specifying one or more second application commands;
    determining a third measure of correlation between the one or more first application commands and the one or more second application commands; and
    based on the third measure of correlation, determining that the second discussion element is to be transmitted to the fourth user.

21. A computing device, comprising:
    a memory; and
    a central processing unit coupled to the memory, configured to:
        receive a first discussion element associated with a first user and comprising:
            textual input from the first user and related to a first software application, and
            first contextual information related to the first software application;
        receive second contextual information associated with a second user and related to the first software application;
        determine, via a processing unit, a measure of correlation between the first contextual information and the second contextual information; and
        based on the measure of correlation, determine that the first discussion element is to be transmitted to the second user and transmit the first discussion element to the second user.

22. The computing device of claim 21, further configured to receive the first discussion element from the second user, wherein the first discussion element has been modified by the second user.

* * * * *

UNITED STATES PATENT AND TRADEMARK OFFICE
CERTIFICATE OF CORRECTION

PATENT NO.        : 9,465,503 B2
APPLICATION NO.   : 13/650064
DATED             : October 11, 2016
INVENTOR(S)       : Justin Frank Matejka, Tovi Grossman and George Fitzmaurice Page 1 of 1

It is certified that error appears in the above-identified patent and that said Letters Patent is hereby corrected as shown below:

On the Title Page

(71) Applicant:

Please delete "San Rafael (CA)" and insert --San Rafael, CA (US)--.

Signed and Sealed this
Thirty-first Day of January, 2017

Michelle K. Lee
*Director of the United States Patent and Trademark Office*